United States Patent Office 2,819,145
Patented Jan. 7, 1958

2,819,145

METAL VALUE RECOVERY FROM LEACHED ZONE MATERIAL

Robert F. McCullough and William J. McGinnis, Lakeland, Fla., assignors, by mesne assignments, to the United States of America as represented by the United States Atomic Energy Commission No Drawing. Application October 15, 1952
Serial No. 314,946

12 Claims. (Cl. 23—14.5)

This process relates to the recovery of certain mineral values found in the so-called leached zone of the overburden from the phosphate matrix found in the Florida pebble phosphate fields. The leached zone layer lies intermediate to the sandy top cover and phosphate matrix and ranges from 6 to 11 feet in depth. Strip mining removes the sandy top layer. The leached zone or so-called Bartow clay is less phosphate generally than the phosphate matrix. It contains aluminum and minor element values and has uranium values ranging from 0.007 to 0.3%.

A typical leached zone analysis averages as follows:

|  | Percent |
|---|---|
| $P_2O_5$ | 8.69 |
| $Al_2O_3$ | 8.68 |
| $CaO$ | 6.37 |
| $Fe_2O_3$ | 1.61 |
| $U_3O_8$ | 0.0144 |
| Acid insolubles | 68.72 |

Since the vast percentages of the acid insoluble material is quartz of a particle size coarser than the other materials being mined, it has been found advantageous, but not necessary to the invention, to split the ore after comminution, if desired, into a small particle fraction and a coarser particle fraction. This split is effected at from about 150 mesh up to about 220 mesh. The fraction containing the small particles is the valuble fraction for the purposes of the instant invention and contains roughly 80% of the valuable minerals to be found in the leached zone material.

In the processing of say the −150 mesh material, the slurry from the ore dressing operation is thickened to about 30% to about 65% solids density. This slurry is reacted or digested with an acid, such as sulfuric, under such conditions of time, temperature, pressure, concentration of acid and total amount of acid as to obtain optimum recovery of the uranium, phosphatic and aluminum values contained in the material, i. e., through the formation of compounds soluble in aqueous mediums. Preferably the solids are reacted with sulfuric acid only or in combination with an oxidizing agent such as nitric acid under constant and intensive agitation. These methods of acidification are best described as (1) wet process method, (2) the aging method and (3) the pressure method.

In the wet process method, a 200 mesh slurried material is subjected to the reaction of sulfuric acid under such conditions of time, temperature, concentration of acid and total amount of acid used as to obtain optimum recovery of the uranium, phosphorus and aluminum values contained in the material, i. e., through the solubilizing of these values by the acid treatment. The description hereinafter given will be made with reference to −200 mesh material, however, as heretofore stated this material could be varying from −150 mesh as well as any point inbetween 150 and 220 mesh, since the mesh size within these limits does not materially affect the operability of the process. In the Wet Process Method a temperature as high as practical consistent with the limits of the equipment and with economical process practices is generally employed. This temperature ranges between about 60° and about 90° C., although temperatures outside of this range may be employed if economy is no object. Preferably, however, the operating temperature is about 75° C.

Digestion is carried out for a period of time ranging between about 0.2 and about 6 hours. Preferably conditions of digestion are such that between about 15 and about 20 minutes are needed for solubilizing, although the length of time may be varied considerably depending upon the other three variations in reaction conditions as hereinbefore stated. The inter-dependence of these four variables makes vast differences in the specific conditions employed as to each variation. Thus, for example, if about 86% acidulation is to be obtained, i. e., through the use of about 98 pounds of sulfuric acid per 100 pounds of clay, it requires only about 15 minutes to accomplish the digestion while at about 45% acidulation, i. e., about 51.6 pounds of sulfuric acid per 100 pounds of leached zone material requires about 6 hours to give a good recovery through the solubilizing of the desired constituents in the leached zone material. After all of the sulfuric acid has been added, the concentration contained in the mixture should be between about 20 and about 50% sulfuric acid, preferably about 30% concentration from the standpoint of attaining a high overall recovery of the desired mineral values contained in the leached zone material, while at the same time having good mixing characteristics in the slurry. In general, the higher the acid strength in the final mixture, the better the dissolution of the desired constituents in the slurry. The acid, of course, may be added as 98% sulfuric acid so that it is diluted as a result of its addition to the aqueous slurry of the leached zone material. The acid may also be added in a partially dilute state by pre-admixing it with water to a certain extent, say 70% acid, so that upon addition to the leached zone material slurry, the desired final acid concentration in the mixture is attained. In general, the amount of acid added, as before stated, is correlated to a large extent with the other reaction conditions, namely, the temperature under which the digestion and solubilizing takes place, the time of the digestion and the final acid strength and total amount of acid present in the slurry. Depending upon the analysis of the particular leached zone material processed, between about 30 and about 120% acidulation is desired. This corresponds to the addition of between about 40 and about 155 pounds of sulfuric acid per 100 pounds of leached zone material processed. Preferably about 88% acidulation that is using about 100 pounds of sulfuric acid per 100 pounds of leached zone material. Economic considerations however may limit the total amount of sulfuric acid used to somewhat lesser amounts or to save the sulfuric acid used. The more acid added, of course, the higher the extraction of the uranium, phosphorus and aluminum values from the leached zone ore fraction.

The percent acidulation referred to in this description is calculated on the basis of the reaction of sulfuric acid with all of the iron, calcium, magnesium and sodium present in the leached zone material. In other words, 100% acidulation would be the addition of that amount of sulfuric acid required to completely react with these components.

The second method of solubilizing these desired mineral values with sulfuric acid is known as the so-called aging method, in that the sulfuric acid is contacted in much the same manner as in the first method except that the slurry density is considerably higher with respect to the solids content, and it is somewhat similar to the commercial process employed in the manufacture of superphosphate, through the acidulation of phosphate rock with sulfuric acid. The sulfuric acid is added to the slurry of −200 mesh leached zone material at atmospheric temperature. During the addition an exothermic reaction takes place so that the final mixture is because of this exothermic reaction at a slightly elevated temperature. The time of mixing is not particularly critical except that it should be for a sufficient length of time to enable a thorough dispersion of the acid into the solid materials or slurry so that between usually about 3 and about 5 minutes will provide an ample time to accomplish this result. The soupy mixture resulting from the acid addition is then removed to a curing pile where it remains for between about 20 and about 60 days, preferably for about 45 days, though the exact time is not critical. In general, however, the longer the mixed material is cured the higher the ultimate recovery of the desired constituents will be.

The concentration of acid employed is usually the highest possible concentration compatible with the type of equipment used and with the ability to mechanically agitate the soupy material during the acid addition step. The sulfuric acid is usually added to give 20 to 65% aqueous sulfuric acid. The highest concentration of acid possible is added bearing in mind that there must be good mechanical agitation attained and there must also be quite fluid mass, that is, one having sufficient water present so as to have a final acid mixed mass of material that adapts itself to transport on an endless belt, yet also adapts itself to curing in a pile. The greater the amount of sulfuric acid employed, that is the greater the percent of acidulation, the greater the ultimate recovery of the desired constituents will be. However, for practical operating consideration and from economic consideration the amount of acidulation will vary from between about 35 and about 75%, preferably about 65%.

The third method of solubilizing the desired mineral values of the leached zone material by means of sulfuric acid is the autoclave or pressure method. This method has been found to be the preferred method for accomplishing the recovery of the desired mineral values. The 20 to 65% solid slurry of −200 mesh leached zone material is placed in an autoclave and is heated under either extraneously produced or autogenous pressure. Pressures ranging between about 10 and about 175 pounds per square inch or above are useable, but it is preferred to use about 160 pounds per square inch gauge. Higher and lower pressures may be employed, but the pressures in the upper portion of the range are required if the percent acidulation used is of a low order, and of course the lower pressures may be used if the percent acidulation is of a relatively high order. Otherwise, the ultimate recoveries of the desired mineral values are considerably lower. Usually the temperature of the reaction mass is above atmospheric, or between about 75° and up to about 200° C., but usually the elevated temperature is only sufficient to attain the heretofore designated pressures. The ultimate concentration of the sulfuric acid in the slurried mixture is about the same as that described in connection with the two previous methods of solubilizing the −200 mesh leached zone material with sulfuric acid, namely, between about 20 and about 50% and preferably 30%; that is, in the final mixture after acidulation the concentration of sulfuric acid will be about 30% based on the final composition. The time of digestion required will range between about 0.01 and about 1.0 hour, preferably about 0.75 hour. Although the phosphorus values are consequently high in the ultimate recovery, it is necessary to use the longer times in order to attain higher aluminum and uranium recoveries. Furthermore, in order to get substantially complete conversion of the uranium values under the conditions obtaining, the percent acidulation should range between about 30 and about 90%, preferably about 80%, while having also regard to the economic considerations such as the type of equipment and its ability to withstand corrosion, the cost of the acid and the like.

Based on the above considerations with regard to the autoclave method, about 1500 pounds of sulfuric acid are required per ton of −200 mesh leached zone material. The mineral digest obtained after digestion with this acid and by means of this method gives between about 84 and about 93% of the $U_3O_8$ present originally in the leached zone material, and between about 90 and about 92% of the alumina originally present in the −200 mesh leached zone material and between about 86 and about 93% of the $P_2O_5$ present in the −200 mesh leached zone material. Additionally, this method has the added advantage that the final slurry has been found to be more easily filtered, that is a faster filtering rate is attained than is the case with respect to slurries prepared by the two preceding methods. Although temperatures up to 200° C. may be used, the recoveries are not usually sufficiently greater when using such high temperatures as to be justified when considering the increased cost necessary to attain those high temperatures. In general, the lower temperatures with slightly longer times of digestion will be just as advantageous, and in fact from the standpoint of uranium recovery generally slightly more advantageous than the use of high temperatures over shorter periods. The time of digestion required will range between about 0.1 and about 1 hour, preferably between about 15 minutes and about 45 minutes. In this superatmospheric pressure method, of course, the pressure employed will vary as will the other reaction conditions depending upon any specific set of values maintained for reaction conditions. The higher the superatmospheric pressure employed, and the higher the temperature employed, the shorter the contact time required for digestion and dissolution of the mineral values. On the other hand, the milder reaction conditions of temperature and pressure will require longer period of reaction time.

Under some circumstances it is desirable to add nitric acid or other material having oxidizing ability under the conditions of reaction of acid with leached zone material.

Nitric acid, or other material capable of giving an oxidizing reaction, is added to the extent of between about 0.1 and about 5.0 pounds of nitric acid, preferably 0.4 to 1.0 pound per 100 pounds of leached zone treated. For other oxidizing agents employed the number of pounds will generally vary from these stated ranges in proportion to the ratio of the oxidation equivalent of these agents to the oxidation equivalent of nitric acid. The use of the oxidizing agent results in increasing the water-solubility of the uranium content of the leached zone by apparently insuring the presence of the uranium in the hexavalent state.

The oxidizing agent may be added in the case of solid substances, as solid material or in aqueous solution and, of course, in the case of liquid oxidizing agents, as liquids. It is preferable to add the oxidizing agents substantially simultaneously with the sulfuric acid addition or preceding the sulfuric acid addition since these expedients result in an excellent water-solubilizing of the uranium values. The addition of the oxidizing agent subsequent to the sulfuric acid addition is useful but less desirable from the standpoint of good recoveries of uranium. Suitable oxidizing agents that may be employed in place of nitric acid are the hypochlorites, chlorites, chlorates, perchlorates, alkali metal nitrates, alkaline earth metal nitrates, such as hydrogen peroxide, potassium chlorate, sodium chlorate, sodium, potassium, calcium nitrates, manganese dioxide, potassium permanganate and calcium hypochlorite.

The digested material after treatment with sulfuric acid, with or without the addition of an oxidizing agent, in one of the three methods previously described herein, is then mixed with water and slurried therewith in order to take up as an aqueous solution all of the water-soluble values contained in the acidified and digested leached zone material. The taking up in water is generally done in a step-wise multistage (usually 3 or 4) countercurrent operations involving a mixer, a filter or another liquid-solid separation means followed by a second mixer and a second liquid-solid separation means, usually a filter. The liquid, starting as water, in general goes from the last stage toward the first stage while the solids go from the first stage toward the last stage. The extract of dissolved material containing the uranium, phosphorous and aluminum values, normally at a specific gravity of 1.3, is then subjected to an alum crystallization operation, using ammonium sulfate and/or ammonium acid sulfate as the addition reagents. Before the treatment with the ammonium sulfates, the filtrate from the solids-liquid separation is adjusted to a specific gravity of about 1.3 measured under standard conditions and the ammonium sulfate and/or ammonium acid sulfate is then dissolved in this filtrate and further subjected to a liquid-solid separation operation to separate out the alum crystals of ammonium aluminum double sulfates. Adjustment of the specific gravity of the filtrate to between about 1.25 and about 1.50 is satisfactory, but a specific gravity of about 1.3, prior to alum removal, is preferred. The digestion with, or initial solution of the ammonium sulfates is normally accomplished at temperatures around 70° C., the ammonium sulfate being added either as fresh or recycled material from another section of the process as hereinafter described, however, it may be added at room temperature or lower temperature and the desired recovery of alum still attained, although addition at a lower temperature usually gives a more impure product.

Maximum yields in the crystallization of the ammonium alum depends upon proper correlations of time, temperature, specific gravity of the solution prior to ammonium sulfate and/or ammonium acid sulfate addition, and quantity of ammonium sulfates added. It has been found that a crystallizing time of about 2 up to about 24 hours is satisfactory, longer times favoring the higher recovery of the alum crystals, but 2 to 4 hours is normally used in plant operation. Temperature of crystallization is important in that lower temperatures favor higher recoveries, usually about a 10% increase in alum crystallization results in cooling below 25° C. The range of temperatures normally preferred varies between about −10° C., and about +25° C. with 5° C. being normally used having regard to economical selection and operation of cooling equipment and the subsequent effect on the treatment of the solution and recovery of the $Al_2O_3$ contained in the liquor in processing steps to be subsequently described. The specific gravity of the solution will normally be as hereinbefore stated about 1.3, however, increasing the specific gravity to about 1.4 gives a slight increase in recovery, but at the same time produces a somewhat more viscous solution so that crystallization is more difficult to accomplish and the separation of the crystals from the liquid becomes more difficult as well. The lower specific gravities, that is gravities less than 1.3, decrease the overall $Al_2O_3$ recovery in the form of an alum. Recoveries of the $Al_2O_3$ vary between about 60 and about 95% with about 88% being a usual figure.

It has been found that the quantity of sulfate should preferably approach an $Al_2O_3$ to $SO_4$ mol ratio of about 1 to 4 or at least the sulfate should be in excess of that required to combine with the $Al_2O_3$ to give aluminum sulfate. Adjustment of the solution to give the desired $Al_2O_3$ to $SO_4$ ratio is preferably made with sulfuric acid, ammonium acid sulfate, ammonium acid sulfate and ammonium sulfate mixtures or other sulfates such as potassium sulfates which results in the formation of a relatively insoluble alum under the crystallizing conditions described herein. The adjustment of the $Al_2O_3$ to $SO_4$ ratio, when made with sulfuric acid can be made in the digestion circuit prior to or during the crystallizing operation. However, an important modification of the leached zone digestion with sulfuric acid involves the acidulation at lower percent acidulations than 100%. If acidulation at 100%, the $Al_2O_3$ to $SO_4$ mol ratio from the leaching operation, heretofore described, would be about 1 to 3 and, if a lower percent acidulation, say 60% were used, this ratio would be approximately 1 to 2, or even less. Alum crystallization from liquor containing an $Al_2O_3$ to $SO_4$ ratio of 1 to 2 would give considerably less alum recovery than a 1 to 3 ratio, the latter ratio giving less recovery than a 1 to 4 ratio under a given set of crystallizing conditions. Adjustment of the solution composition $Al_2O_3$ to $SO_4$ mol ratio, to give less than 1 to 1, but greater than 1 to 4, gives a slight increase in alum recovery and solutions of higher than 1 to 4 ratios, which is normally preferred, depends upon efficient operation of the entire procedure as herein described. By use of lower percent acidulations than 100% a considerable savings in fresh sulfuric acid can be effected if ammonium acid sulfate or ammonium acid sulfate and ammonium sulfate mixtures are added to the liquor prior to the alum removal step. This is added on the basis that part of the sulfate content from the ammonium acid sulfate combines as heretofore described and the combined ammonia added combines as ammonium sulfate. It is quite important that the ammonium content of the solution does not significantly increase above that to give ammonium sulfate with the 1 to 4 $Al_2O_3$ to $SO_4$ ratio attained since an increase in alkalinity as $NH_3$ will decrease alum recovery under a given set of crystallizing conditions. Ammonium sulfate and/or ammonium acid sulfate is normally added such that a $(NH_4)_2SO_4$ to $Al_2O_3$ mol ratio of 1.0 to 3.0 results, with the previously described $Al_2O_3$ to $SO_4$ ratio attained. Normaly, however, it is preferred to have a $(NH_4)_2SO_4$ to $Al_2O_3$ mol ratio of about 1.8 to 1, although increasing above this ratio would give some increase in alum recovery while at the same time, if the ratio is high enough, would start introducing ammonium sulfate and/or ammonium acid sulfate in the crystals. The solution composition from the leached zone digestion and leaching operations can vary considerably in the mol ratio of $Al_2O_3$ to $Fe_2O_3$ and $Al_2O_3$ to $P_2O_5$. The former, usually a mol ratio of about 10 to 1, is considered to generally affect only the purity of the crystals produced, however, the latter has a significant effect on the alum recovery under a given set of crystallizing conditions. The $Al_2O_3$ to $P_2O_5$ mol ratio in the resulting liquors has been found to vary between about 10 to 1 and about 0.6 to 1 with a mol ratio of 1.2 to 1 normally expected. Increasing the above ratio gives higher total alum recovery while decreasing the ratio decreases the $P_2O_5$ recovery. The slower the crystallization of the alum the better the exclusion of entrapped or occluded mother liquor in the crystals and hence the purer the alum produced. Also this purification or slow crystallization to get a pure product results in less loss of uranium and $P_2O_5$ in conjunction with the alum crystals.

A typical analysis of the crude alum crystals produced is as follows (on a moisture free basis):

| | Percent |
|---|---|
| $SO_4$ | 45.84 |
| $Al_2O_3$ | 10.39 |
| $NH_3$ | 3.57 |
| $P_2O_5$ | 0.82 |
| $Fe_2O_3$ | 0.16 |

These crystals may be dried and sold as such or reacted, as hereinafter to be described, with ammonium hydroxide to make an aluminum hydrate. Aluminum hydrate may be then calcined to make alumina. Normally, however, the purity of the alumina is not sufficiently high enough that it is desirable for aluminum manufacture. For this reason it is normally preferable to further purify the ammonium alum or its reaction products, One purification procedure which may be employed is to make a crude aluminum hydrate followed by purification in a modified Bayer or other standard circuit known to those familiar with the art. Preferably, however, the crude ammonium alum crystals are purified by recrystallization. Between about one and about four recrystallizations, normally two recrystallizations, will increase the purity of the product such that it is a very desirable raw material for the production of alumina.

Preferably, the first and second crystallization of the ammonium alum is carried out to obtain crystals which are large enough to give crystals permitting rapid filtration, centrifuging or even rake classification. Normally, however, a pan filter would be used thus permitting a wash on the same filter. Factors governing the second crystallization are similar to those in the first crystallization except that in the second crystallization the conditions are more closely allied to the pure component phase system of ammonium alum. One main objective of the alum crystallization is to prepare a material sufficiently low in $P_2O_5$ and $Fe_2O_3$ so that the resulting crystals can be reacted further to form $Al_2O_3 \cdot xH_2O$ which can be converted to an aluminum material suitable for the production of aluminum metal in an efficient manner. It is normally necessary and preferred to recrystallize the alum formed in the first crystallization although, depending upon the initial concentration and method of crystallizing employed in the first crystallization, it is sometimes possible to by-pass the second crystallization. Crystal purity desird in either of the above modifications is such that the $Al_2O_3 \cdot xH_2O$ made can be used in aluminum metal manufacture, i. e., with a high cell efficiency, metal purity and recovery. Generally, the alum crystals initially separated from the alum crystallizer are redissolved with wash water and/or a solution of ammonium sulfate, normally from the operations involved in making $Al_2O_3 \cdot xH_2O$ hereinafter to be described, or with mother liquor from the second crystallization of alum and from that a second crystallization of the alum is introduced and the crystals, in more highly purified form, are separated by means of a liquid solid separation step.

Preferably, the crystals from the second crystallization are washed with water, normally cooled, said liquor from this washing being added to the mother liquor therefrom and this mother liquor partially used in redissolving crystals from the primary crystallization while the remaining portion, usually about 10% of the mother liquor stream, or the quantity required to prevent a build-up of $Fe_2O_3$, $P_2O_5$ or other impurity, used to wash crystals from the first crystallization, said liquor therefrom normally being added to the liquor prior to or during the first alum crystallization. This liquor can likewise be added to the liquor from the primary or first crystallization with recoverable values therein being recovered in later processing and/or recycled from some subsequent processing stream. A typical analysis of crystals produced by this procedure is, on a moisture free basis, as follows:

|  | Percent |
|---|---|
| $SO_4$ | 46.00 |
| $Al_2O_3$ | 10.42 |
| $NH_3$ | 3.60 |
| $P_2O_5$ | 0.0002 |
| $Fe_2O_3$ | 0.0001 |

Alternatively, the same crystallization may be accomplished with the initial crystallization temperature being above those heretofore stated, but below about 60° C. The initial purity of the crystals from the higher temperature crystallization, is normally better than that obtained in crystals from lower temperature crystallizations but initial yields of alum decreased. In this alternative procedure, after a solid-liquid separation of the crystals at a higher temperature, say 45° C., the resulting liquors are cooled to less than 25° C., the alum crystallized and this second fraction of alum cycled to the initial crystallization. Still another modification for the recovery of $Al_2O_3$ involves the evaporation of the solution prior to ammonium sulfate addition to specific gravities above 1.4 and cooling to crystallize $Al_2(SO_4)_3$. $Al_2O_3$ recoveries by this procedure are low and ammonium sulfate and/or ammonium acid sulfate is normally added to this solution to crystallize ammonium alum which is processed as heretofore described. In each of the above modifications and alternates, where an aluminum material is recovered, the resulting liquor is then processed to recover values in this solution, i. e., uranium, phosphorus, sulfate, ammonia, aluminum, iron, etc. It is also to be understood that any solution or solids which are otherwise prepared, but similar to and within the range of the value stated herein, are amenable to the processing operations stated heretofore. In the preferred procedure the liquor from the first alum crystallization separation step is the feed material from which the uranium, phosphorus, etc., values are ultimately recovered. This will be described in detail hereinafter.

The solid alum crystals from the second crystallization step, although as heretofore stated more crystallizations may be used, are then reacted with ammonium hydroxide and/or ammonia gas in a reaction vessel to produce an aluminum hydroxide and/or aluminum hydrate material together with ammonium sulfate. The same may also be accomplished with ammonium alum crystals other than those by the preferred procedure since, depending upon the source of the alum crystals, the resulting material may or may not be of the desired purity normally preferred for metallurgical grade metallic aluminum or other uses of an aluminum hydroxide, aluminum hydrate or aluminum oxide.

A number of alternative procedures may be used to recover the aluminum content of the alum as aluminum oxide, but they are not a part of the instant invention.

Aqueous mineral digest solution from which alum has been removed contains the dissolved uranium values and is subjected to contact with an organic solvent having affinity for uranium values for extraction therof. Solvent extraction process is known, but the present process is an improvement upon that known heretofore.

The aqueous mineral digest solution containing the uranium dissolved therein is preferably first subjected to a reduction reaction. This may be accomplished by electrolytic means or by chemical reaction wherein the solution is treated with metallic iron, aluminum or other free metals or other reducing agents capable of reducing the solution but not substantially introducing metallic ions detrimental to specifications of final products, said metals usually being added in solid form. This is believed to partially, if not completely, reduce the uranium from a hexavalent state to a quadrivalent state. If the addition agent is in powdered form the slurry, after several minutes is subjected to a liquid-solid separation to remove the unreacted and insoluble metal therefrom. This may be accomplished through the use of a filter, centrifuge, cyclone or other suitable separation device. The reduced aqueous phase is then inimately contacted, stirred or otherwise agitated with the organic solvent phase. This solvent phase is made up of two components, the extractant and the vehicle or extender. The extractant may be one or more of the ortho or pyro phosphoric acid esters of the alkyl monohydric alcohols. Both the mono and di esters, as well as mixtures of the two are useful. The butyl, amyl, hexyl, heptyl, n-octyl, iso octyl, etc., esters with the phosphoric acids are staisfactory for the purpose, but it is preferred to use the mono and/or di esters of either octyl or hexyl alcohol with orthophosphoric acid since these are less water-soluble because its use minimizes any possibility of precipitation of phosphate compounds at the aqueous-organic liquid interface. Of course, it is to be understood that other extractants, which are relatviely immiscible with the aqueous phase and having uranium removal characteristics are likewise satisfactory. The extender or vehicle may be any one or more of the common organic solvents such as kerosene, benzene, paper and varnish makers naphtha, mineral spirits, carbon tetrachloride, beta, beta dichlordiethyl ether, trichlorethylene, toluene, xylenes, and the like. Extenders such as these are limited only in that they must be miscible or partially miscible with the extractant used and substantially immiscible with the aqueous phase. Since the esters or extractants have a limited solubility in water, before recycling to the uranium extraction system, the aqueous medium is normally scrubbed with any suitable solvent such as kerosene or trichlorethylene to reduce the ester content which would be lost in subsequent processing.

The concentration of the extractant in the extender or vehicle may vary widely, for example between about 0.2 and about 100.0%, preferably between about 5 and about 10%. The volume ratios of aqueous phase to organic phase also may vary within wide limits, for example between about 1 to 1 and about 40 to 1, preferably between about 5 to 1 and about 20 to 1. It is preferred to contact the organic phase with the aqueous phase under conditions near that which the latter emerges from the countercurrent leaching circuit, i. e., usually at a temperature of between about room temperature and about 60° C., preferably about 50° C. After agitation of the two phases for about one minute or less, although longer times may be used, the aqueous phase is withdrawn from the bottom and the organic phase is withdrawn from the top of a mixer extraction column. A continuous extraction is usually carried out in commercial operation in a multistage countercurrent extractor (using about 6 stages). This is preferred for efficient performance since, by using such a system, the organic phase will take up about 98% of the uranium values originally present in the aqueous phase. A single stage of extraction using normal octyl phosphoric acid ester has resulted in an extraction of about 95% of the uranium values present in the aqueous phase. Substantially complete reduction, 10% of extractant extended in kerosene and a 10 to 1 volume ratio of aqueous phase to organic phase was employed in that instance. Contact time, within the range of the equipment used has not been found to be a critical factor.

The organic phase is treated with aqueous hydrofluoric acid in about 5 molar excess over that required to produce $UF_4$. This precipitated material, together with its accompanying aqueous HF phase, is separated from the organic phase and the solid containing $UF_4$ is recovered by filtering, centrifuging, or the like, washed and dried. The organic solvent from which the uranium values have been removed is heated to about 60° C. for about 15 minutes to evolve hydrofluoric acid which is recovered and reused and the organic phase reduced in HF concentration, is recycled for further extraction use in the process. This organic extractant, it has been found, loses its extraction efficiency. The efficiency can be partially restored by the procedure heretofore described, but after use through 5 to 10 cycles the efficiency drops to such a level that the extractant must be reactivated or discarded. Alternately, whether or not the hydrofluoric acid is evolved prior to recycle of the organic phase, and in order to maintain the extraction efficiency of the extractant, the organic phase is treated with solid phosphorus pentoxide and washed with 60% orthophosphoric acid prior to recycling it to the extraction columns. Filter cakes analyzing about 58% $UF_4$, or more, are obtainable, although the yield, recovery and purity of product obtained varies considerably depending upon which of the particular variations in the procedure is employed. The aqueous phase from the original extraction with organic selective solvent is then further processed to recover the phosphorus, ammonium and sulfate values.

Following the removal of the uranium as described above, the resulting liquor containing phosphorus, aluminum, iron, nitrogen, sulfur and $P_2O_5$ values present, probably as ammonium sulfate, ammonium acid sulfate, aluminum sulfate, iron sulfate, sulfuric acid and phosphoric acid, is neutralized with various agents depending upon whether the final products desired are insoluble or soluble phosphates. The solution may be neutralized with oxygen-containing basic alkaline earth metal compounds, such as calcium oxide, if the final product desired is to be water insoluble. Preferably, however, neutralization is effected with ammonium hydroxide or ammonium gas. In an ammonium hydroxide neutralization the acidity of the solution is preferably decreased to give a precipitation of insoluble values present, i. e., aluminum phosphate and iron phosphate. This precipitation, it has been found, can be made relatively selective if step-wise precipitation is employed.

In a step-wise operation the solution is neutralized initially to a pH of about 3.5, separating the solids produced and then neutralizing to a pH of about 7. In this step-wise operation the first precipitation is predominantly aluminum phosphate, whereas the product of the second precipitation effects substantially complete removal of these precipitable values. The rich fraction of aluminum phosphate may be cycled to the alum circuit for subsequent recovery of aluminum and phosphorus values and/or dried to remove entrained moisture separately or together with the second precipitate largely rich in iron phosphate. Said dryer products may then be combined with ammonium phosphate and/or ammonium sulfate hereinafter to be described and/or sold as a product of commerce suitable for agricultural consumption.

Dependent upon pH at which the iron and aluminum phosphates have been precipitated, the resulting solution, following filtration, may be processed to produce a mixture of ammonium salts or may be processed to obtain a relatively pure tri-ammonium phosphate with ammonium sulfate as a byproduct thereof. In the first instance when precipitation has been effected at a pH of about 6, and the iron and aluminum phosphates preferably removed therefrom, the solution may be concentrated and selective crystallization effected based upon temperature, relative amount of the constituents present and the degree of concentration. By way of illustration, a solution concentrated at a temperature of about 80° C. will, upon sufficient concentration, crystallize out appreciable quantities of a product which is predominantly ammonium sulfate. Following separation of ammonium sulfate from the solution and upon cooling of the solution a secondary precipitation may be effected which will give a product which is predominantly ammonium phosphate. The solution from which the ammonium salts have been removed may then be used as recycle material to suitable precipitation or evaporation stages.

In the event that the aluminum and iron phosphates have been relatively completely removed the resulting solution may be evaporated to approximately 0.5 to 0.6 of its original volume and the concentrate adjusted in pH to about 11.5. Following this adjustment of pH the solution can be cooled and the phosphate material present crystallized from solution largely in the form of tri-ammonium phosphate. Following segregation of the crystallized tri-ammonium phosphate the resulting solution may be processed to obtain, as final products, ammonia or ammonium sulfate, or both, i. e., the ammonium sulfate solution may be heated to drive off ammonia and crystallize ammonium sulfate or the solution may have lime added thereto in which event the final products are ammonia and gypsum.

*Example*

A representative leached zone feed assaying 15.2% $P_2O_5$, 23.21% $Al_2O_3$, 2.68% $Fe_2O_3$ and 0.030% $U_3O_8$, as a 34.4% solids slurry in water, is mixed with 98% sulfuric acid at 1.56 pounds dry solids per pound of acid and autoclaved at 200 pounds per square inch at a temperature of about 388° F. for 1 hour. The resultant mass is cooled and leached countercurrently with water to recover solubilized constituents and the insoluble cake discarded. The resultant extract at 1.31 specific gravity assays 4.72% $P_2O_5$, 6.57% $Al_2O_3$, 0.76% $Fe_2O_3$, 0.0089% $U_3O_8$ and 15.87% $SO_4$. Recoveries in solution are 89% $P_2O_5$, 81% $Al_2O_3$, 81% $Fe_2O_3$ and 86% $U_3O_8$. Add to this extract at 60° C. 0.137 pound $NH_4HSO_4$ and 0.0818 pound $(NH_4)_2SO_4$ per pound of extract and cool to 0° C. to crystallize $Al_2(SO_4)_3 \cdot (NH_4)_2SO_4 \cdot 24H_2O$. The overall recovery of $Al_2O_3$ obtained after recrystallization and washing is 87%. The extract after ammonia alum removal assays 8.61% $P_2O_5$, 0.91% $Al_2O_3$, 1.44% $Fe_2O_3$, 0.015% $U_3O_8$, 14.41% $SO_4$ and 3.07% $NH_3$. The wet crystals of ammonia alum are treated with at least 2.5 times the theoretical amount of concentrated ammonium hydroxide (20% $NH_3$) present to combine with all the $SO_4$ and a filterable hydrated alumina is separated with $Al_2O_3$ recovery in the solid phase of 95 to 100%. The solids are washed substantially free of $(NH_4)_2SO_4$ with water and the hydrated alumina dried and calcined to alumina. Liquors containing ammonia and ammonium sulfate are treated to recover desired products.

The mineral digest solution after alum removal, which has a volume of about 8.82 gallons, was subjected to contact with about 0.44 pound of powdered metallic iron apparently to reduce the uranium to the quadrivalent state and agitated for about 30 minutes after which the solids were filtered from the liquid. This liquid was then thoroughly contacted with about 0.88 gallon of an organic solvent composed of about 9 parts by volume of kerosene and 1 part by volume of a mixture of the mono and di esters of ortho phosphoric acid of iso octyl alcohol. The intimate contact was maintained for a few minutes, usually about 1 to 2 minutes, in each of 4 successive stages. The organic solvent was separated from the last aqueous phase which was then processed to recover the $P_2O_5$ values.

The uranium-containing organic solvent was treated with about 0.88 gallon of 50% aqueous hydrofluoric acid with agitation. The aqueous slurry was removed and the uranium tetrafluoride filtered from solution. About 0.02178 pound of uranium tetrafluoride cake of about 45% U content is recovered from 100 pounds of solution. The aqueous HF filtrate is recycled to the precipitation step after first introducing additional gaseous hydrofluoric acid into it to restore its strength, to 50% hydrofluoric acid.

The organic solvent phase separated from the aqueous hydrofluoric acid slurry is treated with about 0.0785 pound $P_2O_5$ and washed with about 0.88 gallon of 60% aqueous ortho phosphoric acid. After separating the aqueous phase for recycle to the phosphoric acid treatment step the organic solvent is returned to the beginning of the solvent extraction operation for reuse in the system.

Although it is preferred to reduce the valence state of the uranium from six to four before treating with the selective organic solvent, it is satisfactory to extract efficiently as before stated with the uranium in the hexavalent state if three or more stages of extraction are always employed. The organic solvent extraction may also be carried out using a single stage, especially if the uranium is reduced to the quadrivalent stage. However, the percent of extraction will be slightly lower than the 98% shown in the foregoing example.

The resulting solution was adjusted to pH 7.0 with 17.62 pounds of ammonium hydroxide (29%) and evaporated to dryness to recover a material suitable for agricultural consumption.

We claim:

1. A process for the recovery of uranium values from leached zone material of the Florida pebble phosphate overburden which comprises acidulating the leached zone material with aqueous acid solution, admixing a liquor selected from the group consisting of water and an aqueous phosphate solution with the admixture, slurrying the same, separating undissolved solids from the acidic aqueous mineral digest solution containing predominantly aluminum, phosphate and sulfate components, effecting at least a partial reduction of the uranium present in the resultant aqueous liquid to the quadrivalent state, contacting the mineral digest solution with an organic solvent containing an alkyl acid ester of an alkyl monohydric alcohol and a phosphoric acid selected from the group consisting of orthophosphoric acid and pyrophosphoric acid, separating the aqueous phase from the organic phase, treating the organic phase with sufficient aqueous HF to precipitate appreciable quantities of the uranium present and segregating the uranium precipitate from the aqueous phase.

2. A process as in claim 1 wherein the organic solvent is contacted with the reduced solids-free mineral digest solution in a multi-stage countercurrent liquid-liquid extraction operation.

3. A process as in claim 1 wherein the organic solvent is kerosene and the extractant contained therein is a mixture of mono and di esters of ortho and/or pyrophosphoric acid of n-octyl alcohol.

4. A process for the recovery of uranium values from leached zone material of the Florida pebble phosphate overburden which comprises acidulating that portion of the leached zone particles of a size passing through a 150 mesh standard screen with between about 20 and about 100% $H_2SO_4$ in the amount of between about 30% and about 120% of the amount required to react with all of the constituents reactable with $H_2SO_4$, aging the admixture for a period in the range of about 1 minute to about 60 days, admixing a liquor selected from the group consisting of water and an aqueous phosphate solution with aged acidified leached zone material, slurrying the same, separating undissolved solids from the acidic liquid containing predominantly aluminum, phosphate and sulfate components, converting the uranium present in the resultant aqueous liquid to the quadrivalent state, contacting the solids-free liquid with an organic solvent containing an alkyl acid ester of an alkyl monohydric alcohol and a phosphoric acid selected from the group consisting of orthophosphoric acid and pyrophosphoric acid, separating the aqueous phase from the organic phase, treating the separated organic phase with sufficient aqueous hydrofluoric acid to precipitate substantially all of the uranium present and separating the uranium precipitate from the aqueous phase.

5. A process for the recovery of uranium values from leached zone material of the Florida pebble phosphate overburden which comprises acidulating that portion of the leached zone particles of a size passing through a 150 mesh standard screen with between about 20 and about 55% sulfuric acid in the amount of between about 30% and about 120% of the amount required to react with all of the constituents reactable with sulfuric acid while at a temperature between about 60° C. and about 300° C., aging the admixture for a period in the range of about 1 minute to about 60 days, admixing a liquor selected from the group consisting of water and an aqueous phosphate solution with the aged acidified leached zone material, slurrying the same, separating undissolved solids from the acidic liquid containing predominantly aluminum, phosphate and sulfate components, converting uranium present in the resultant aqueous liquid to the quadrivalent state, contacting the solids-free liquid with an organic solvent containing an alkyl acid ester of an alkyl monohydric alcohol and a phosphoric acid selected from the group consisting of orthophosphoric acid and pyrophosphoric acid, separating the aqueous phase from the organic phase, treating the separated organic phase with sufficient aqueous hydrofluoric acid to precipitate substantially all of the uranium present and separating the uranium precipitate from the aqueous phase.

6. A process for the recovery of uranium values from leached zone material of the Florida pebble phosphate overburden which comprises acidulating that portion of the leached zone particles of a size passing through a 150 mesh standard screen with between about 40% and about 65% sulfuric acid in an amount of between about 35% and about 75% of that required to react with all the constituents of the material capable of reacting with sulfuric acid while at a temperature between atmospheric and the exothermic temperature produced by the reaction, aging the reaction mixture for at least about 20 days to about 60 days, admixing a liquor selected from the group consisting of water and an aqueous phosphate solution with the aged acidified leached zone material, slurrying the same, separating undissolved solids from the acidic liquid containing predominantly aluminum, phosphate and sulfate components, converting the uranium present in the resultant aqueous liquid to the quadrivalent state, contacting the solids-free liquid with an organic solvent containing an alkyl acid ester of an alkyl monohydric alcohol and a phosphoric acid selected from the group consisting of orthophosphoric acid and pyrophosphoric acid, separating the aqueous phase from the organic phase, treating the separated organic phase with sufficient aqueous hydrofluoric acid to precipitate substantially all of the uranium present and separating the uranium precipitate from the aqueous phase.

7. A process for the recovery of uranium values from leached zone materials of the Florida pebble phosphate overburden which comprises acidulating the portion of the leached zone particles of a size passing through a 150 mesh standard screen with between about 20% and about 55% sulfuric acid, said acidulated rock mixture containing at least one added reagent capable of acting as an oxidizing agent under the prevailing reaction conditions, said sulfuric acid being used to the extent of between about 30% and about 120% acidulation of the reactable constituents, aging the mixture for between about 1 minute and about 60 days, admixing a liquor selected from the group consisting of water and an aqueous phosphate solution with the aged admixture, separating undissolved solids from the acidic aqueous mineral digest solution containing predominantly aluminum, phosphate and sulfate components, converting the uranium present in the aqueous mineral digest solution to the quadrivalent state, contacting the solids-free liquid with an organic solvent containing an alkyl acid ester of an alkyl monohydric alcohol and a phosphoric acid selected from the group consisting of orthophosphoric acid and pyrophosphoric acid, separating the aqueous phase from the organic phase, treating the separated organic phase with sufficient aqueous hydrofluoric acid to precipitate substantially all of the uranium present and separating the uranium precipitate from the aqueous phase.

8. A process as in claim 7 wherein the oxidizing agent is nitric acid.

9. A process as in claim 7 wherein the oxidizing agent is nitric acid present in the amount of about 0.5 and about 5 pounds of nitric acid per 100 pounds of leached zone acidulated.

10. A process as in claim 7 wherein the organic solvent is kerosene and the extractant therein is a mixture of mono and di esters of n-octyl alcohol.

11. A process as in claim 7 wherein the organic solvent is kerosene and the extractant contained therein is a mixture of mono and di esters of n-octyl alcohol and wherein nitric acid is present in the amount of about 0.5 and about 5 pounds of nitric acid per 100 pounds of leached zone acidulated.

12. A process for the recovery of uranium values from leached zone material which comprises acidulating said leached zone material with aqueous sulfuric acid of between about 60% and about 70% strength in molar excess up to about 20% of that required to react with the reactable impurities present, aging the admixture for at least about 20 days, admixing a liquor selected from the group consisting of water and an aqueous phosphate solution with the aged admixture, slurrying the same, separating undissolved solids from the acidic aqueous mineral digest solution containing predominantly aluminum, phosphate and sulfate components, converting the uranium present in the resultant aqueous mineral digest solution to the quadrivalent state, contacting the solids-free aqueous digest solution with an organic solvent containing an alkyl acid ester of an alkyl monohydric alcohol and a phosphoric acid selected from the group consisting of orthophosphoric acid and pyrophosphoric acid, segregating the aqueous phase from the organic phase, treating the separated organic phase with sufficient aqueous HF to precipitate substantially all of the uranium present, separating the uranium precipitate from the aqueous phase, treating the uranium containing precipitate with aqueous sulfuric acid, heating the resultant slurry to evolve gaseous HF therefrom, separating the calcium sulfate precipitate from the liquid phase and recovering uranyl sulfate from the solids-free liquid phase.

References Cited in the file of this patent

UNITED STATES PATENTS

| | | |
|---|---|---|
| 1,098,282 | McCoy | May 26, 1914 |
| 1,437,191 | Paul | Nov. 28, 1922 |
| 2,013,970 | Moore | Sept. 10, 1935 |
| 2,571,866 | Greene | Oct. 16, 1951 |

FOREIGN PATENTS

| | | |
|---|---|---|
| 437,833 | Great Britain | Nov. 6, 1935 |

OTHER REFERENCES

Friend: Textbook of Inorganic Chemistry, vol. 7, part 3, page 291 (1926); pub. by Charles Griffin & Co., Ltd., London.

Warf: U. S. Atomic Energy Comm. Declassified document No. 2524, declassified Mar. 11, 1949; 10 pages.

Guntz: Comptes Rendus, vol. 234, pages 868–70, Feb. 18, 1952.

Wright: U. S. Atomic Energy Comm. Declassified paper No. Y-884, 20 pages, May 7, 1952.